United States Patent
Groves

(10) Patent No.: US 7,347,414 B2
(45) Date of Patent: Mar. 25, 2008

(54) INTEGRATED VEHICLE SHOCK ABSORBER MOUNT AND JOUNCE BUMPER

(75) Inventor: Jamie Groves, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 38 days.

(21) Appl. No.: 11/428,087

(22) Filed: Jun. 30, 2006

(65) Prior Publication Data

US 2008/0001336 A1    Jan. 3, 2008

(51) Int. Cl.
*B60G 11/14* (2006.01)
(52) U.S. Cl. .................. 267/220; 267/33; 280/124.155
(58) Field of Classification Search ............... 267/221, 267/140, 141, 141.5; 280/124.15
See application file for complete search history.

(56) References Cited

U.S. PATENT DOCUMENTS

| | | | |
|---|---|---|---|
| 4,200,307 A * | 4/1980 | Szabo ................ 280/124.155 |
| 4,274,655 A * | 6/1981 | Lederman ........... 280/124.155 |
| 4,298,193 A * | 11/1981 | Mourray ................... 267/220 |
| 4,462,608 A | 7/1984 | Lederman |
| 4,711,463 A | 12/1987 | Knable et al. |
| 4,721,325 A * | 1/1988 | Mackovjak et al. .. 280/124.155 |
| 4,828,232 A | 5/1989 | Harrod et al. |
| 5,009,401 A | 4/1991 | Weitzenof |
| 5,248,134 A | 9/1993 | Ferguson et al. |
| 5,775,720 A | 7/1998 | Kmiec et al. |
| 5,975,505 A * | 11/1999 | Yoshimoto et al. ........... 267/33 |
| 6,361,027 B1 | 3/2002 | Lun |
| 6,883,651 B2 * | 4/2005 | Fukaya ................ 188/322.12 |
| 2003/0209395 A1 * | 11/2003 | Fukaya ................ 188/322.12 |
| 2005/0012256 A1 | 1/2005 | Huprikar et al. |
| 2006/0001205 A1 * | 1/2006 | Raza .......................... 267/152 |

* cited by examiner

*Primary Examiner*—Christopher P. Schwartz
(74) *Attorney, Agent, or Firm*—Frederick Owens; Brooks Kushman P.C.

(57) ABSTRACT

A shock mount and jounce bumper assembly is assembled to a shock absorber of a vehicle. The shock mount and jounce bumper assembly includes an integrated isolator/jounce bumper that has an internal washer that is insert molded in place in the integrated isolator/jounce bumper. An upper isolator is assembled with bottom and top washers on the opposite side of a sheet metal support from the integrated isolator/jounce bumper.

12 Claims, 3 Drawing Sheets

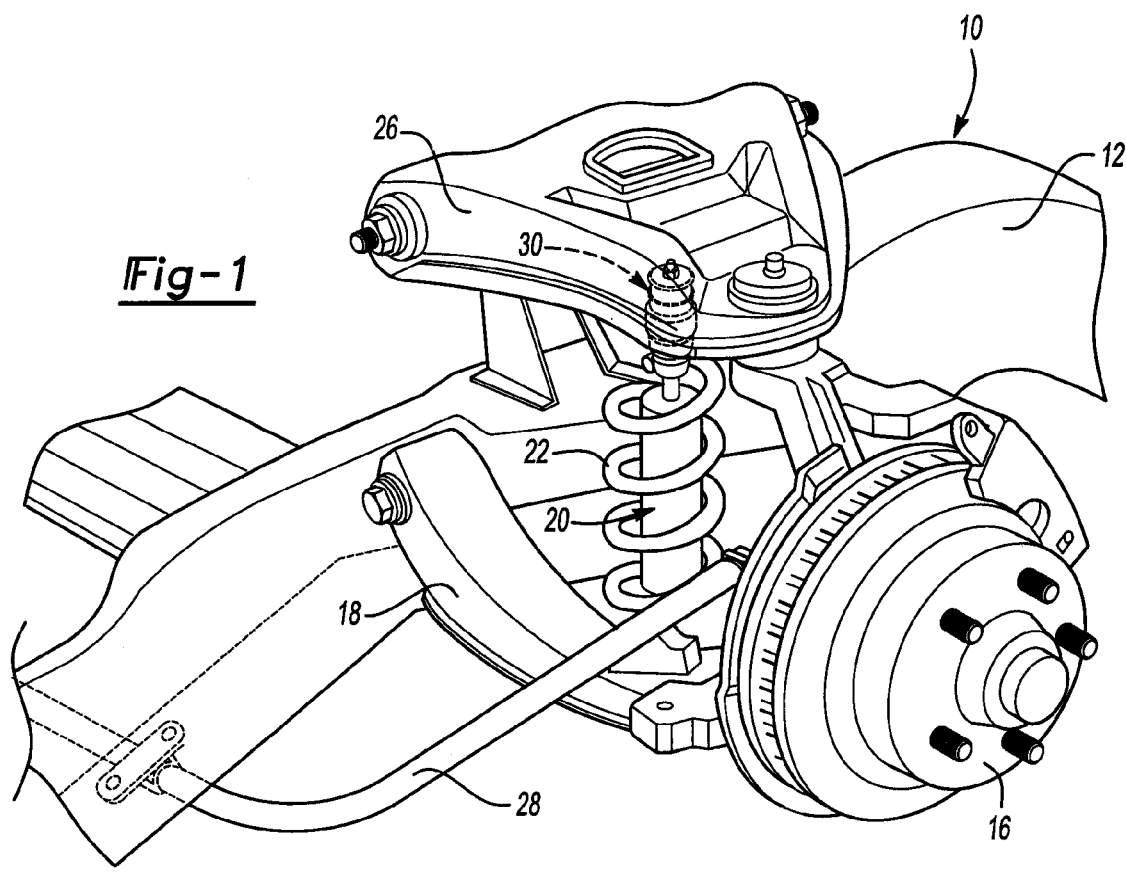
Fig-1
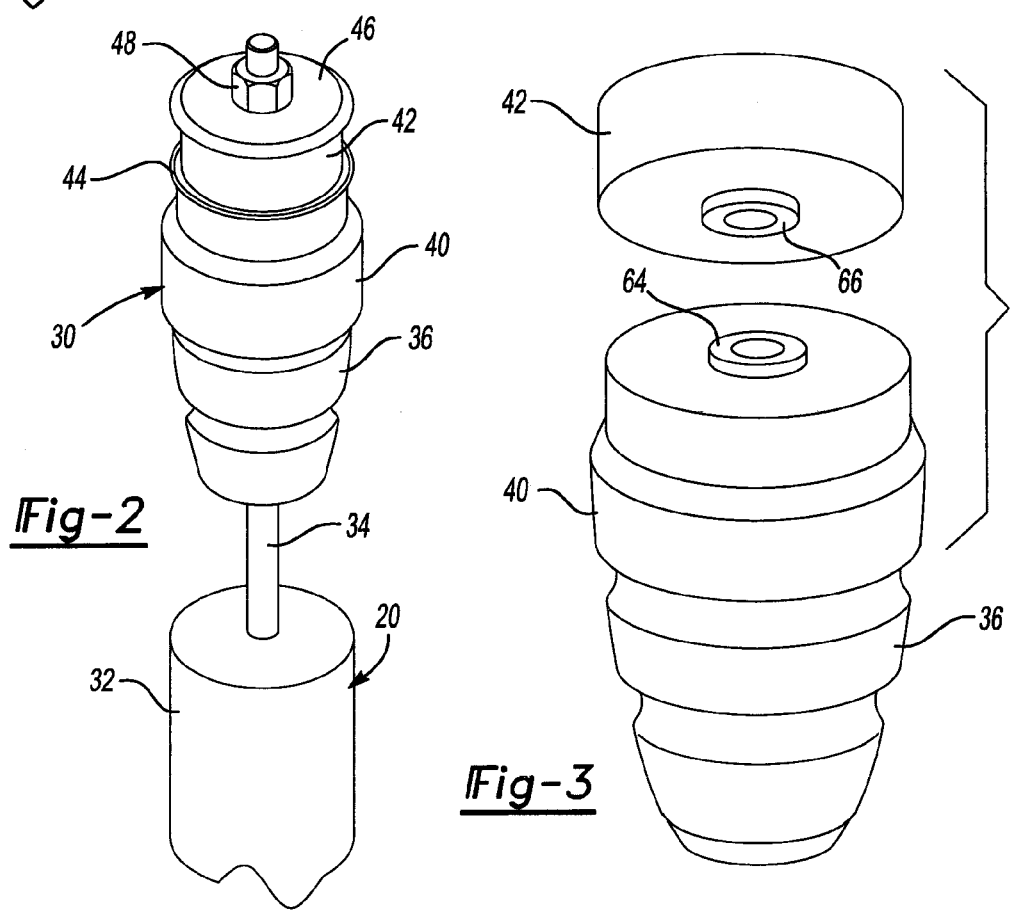
Fig-2
Fig-3

INTEGRATED VEHICLE SHOCK ABSORBER MOUNT AND JOUNCE BUMPER

BACKGROUND OF THE INVENTION

1. Field of the Invention

The present invention relates to vehicle suspension systems that have an integrated shock mount and jounce bumper and a method of making the same.

2. Background Art

Wheel suspensions of vehicles generally include a mounting assembly for a shock absorber that is secured to a chassis or frame of the vehicle. A piston rod of the shock absorber extends from the wheel suspension to the mounting structure. Rubber or elastomeric isolators are generally separately formed and assembled together as part of the mounting assembly. Generally one insulator is assembled to abut the support structure and surrounds the piston rod. A jounce bumper is generally assembled about the piston rod to isolate high amplitude movements of the wheel suspension system. Insulators and jounce bumpers are generally separately formed of an elastomeric material.

A shock absorber mount and jounce bumper assembly are normally separately formed and assembled together as a subassembly prior to attaching the assembly to a car in a vehicle assembly plant. Assembling the parts of the shock mount and jounce bumper assembly requires substantial direct labor costs. Vehicle shock absorber mounts and jounce bumpers are fairly complex and require assembly of multiple parts.

It is generally an objective in vehicle design to reduce the number of parts, or part count, that are required to provide a desired vehicle function. Manufacturing and inventory costs may be reduced by reducing part counts.

There is a need for an integrated vehicle shock absorber mount and jounce bumper that reduces the cost, complexity and part count.

SUMMARY OF THE INVENTION

According to one aspect of the present invention, an integrated shock mount and jounce bumper assembly is provided. The assembly comprises a shock absorber having a shock absorber can and a shock rod. One end of the shock rod is disposed in the shock absorber can and a distal end of the shock rod extends from the shock absorber can. An integrated isolator and jounce bumper is formed in one piece and assembled over the distal end of the shock rod. An internal washer is retained within and disposed between the integrated isolator and jounce bumper. An upper isolator assembly is attached to the shock rod and to the vehicle body member by a fastener. A isolator preload sleeve is assembled over the shock rod and engages one side of the internal washer. The preload sleeve is inserted between the upper isolator and the integrated isolator portion of the integrated assembly.

According to other aspects of the invention, the assembly may further comprise a rate cup assembled to the isolator portion of the assembly that is disposed between the isolator and the vehicle body member. The upper isolator may further comprise a top washer and a bottom washer that are assembled to an isolator body on upper and lower sides of the isolator body.

According to another aspect of the invention, the shock rod may have a shoulder and the internal washer may be assembled to the shock rod in engagement with the shoulder wherein the isolator preload sleeve engages the opposite side of the internal washer relative to the side that engages the shoulder.

According to another aspect of the invention, the internal washer may be disposed between the integrated isolator and jounce bumper and the internal washer may be insert molded into the integrated shock mount and jounce bumper assembly. According to yet another aspect of the present invention, the fastener may be a nut that is secured to a threaded portion of the shock rod to retain the upper isolator assembly against the vehicle body member.

According to another aspect of the invention, a method of manufacturing an integrated shock mount and jounce bumper assembly is provided. The method comprises molding an integrated isolator and jounce bumper about an internal washer that is disposed between an integrated isolator portion and jounce bumper portion. A rate cup is assembled to the isolator portion of the integrated isolator and jounce bumper. The integrated isolator and jounce bumper is assembled with the rate cup to a shock rod of a shock absorber. The shock rod is inserted into the isolator and jounce bumper until it contacts the internal washer. An isolator preload sleeve is assembled over a distal end of the shock rod and inside the isolator portion of the integrated isolator and jounce bumper. The shock rod is inserted through a bracket that is secured to the vehicle and the upper isolator is assembled over the distal end of the shock rod on the opposite side from the integrated isolator and jounce bumper. The integrated shock mount and jounce bumper assembly is secured to the bracket with a fastener.

According to other aspects of the method of manufacturing an integrated shock mount and jounce bumper assembly, the isolator preload sleeve may be inserted inside the isolator portion of the integrated isolator and jounce bumper before or after the step of inserting the shock rod through the bracket.

According to other aspects of the method, an upstanding ring formed on the integrated isolator and jounce bumper that is inserted into an opening in the bracket and between the preload sleeve and the bracket. A depending ring formed on the upper isolator may be inserted into an opening in the bracket and between the preload sleeve and the bracket.

In addition, the step of molding an integrated isolator and jounce bumper about an internal washer that is disposed between an integrated isolator portion and jounce bumper portion thereof is performed in an injection molding process in which the internal washer is inserted into a mold before the elastomer is injected into the mold to form the isolator portion and the jounce bumper portion.

These and other aspects of the present invention will be better understood in view of the attached drawings and following detailed description of the illustrated embodiment.

BRIEF DESCRIPTION OF THE DRAWINGS

FIG. 1 is a perspective view of a vehicle wheel suspension system;

FIG. 2 is a perspective view of a shock absorber, shock mount and jounce assembly;

FIG. 3 is a partially exploded perspective view of a shock absorber mount and jounce bumper;

DETAILED DESCRIPTION OF THE PREFERRED EMBODIMENT(S)

Figure 4:
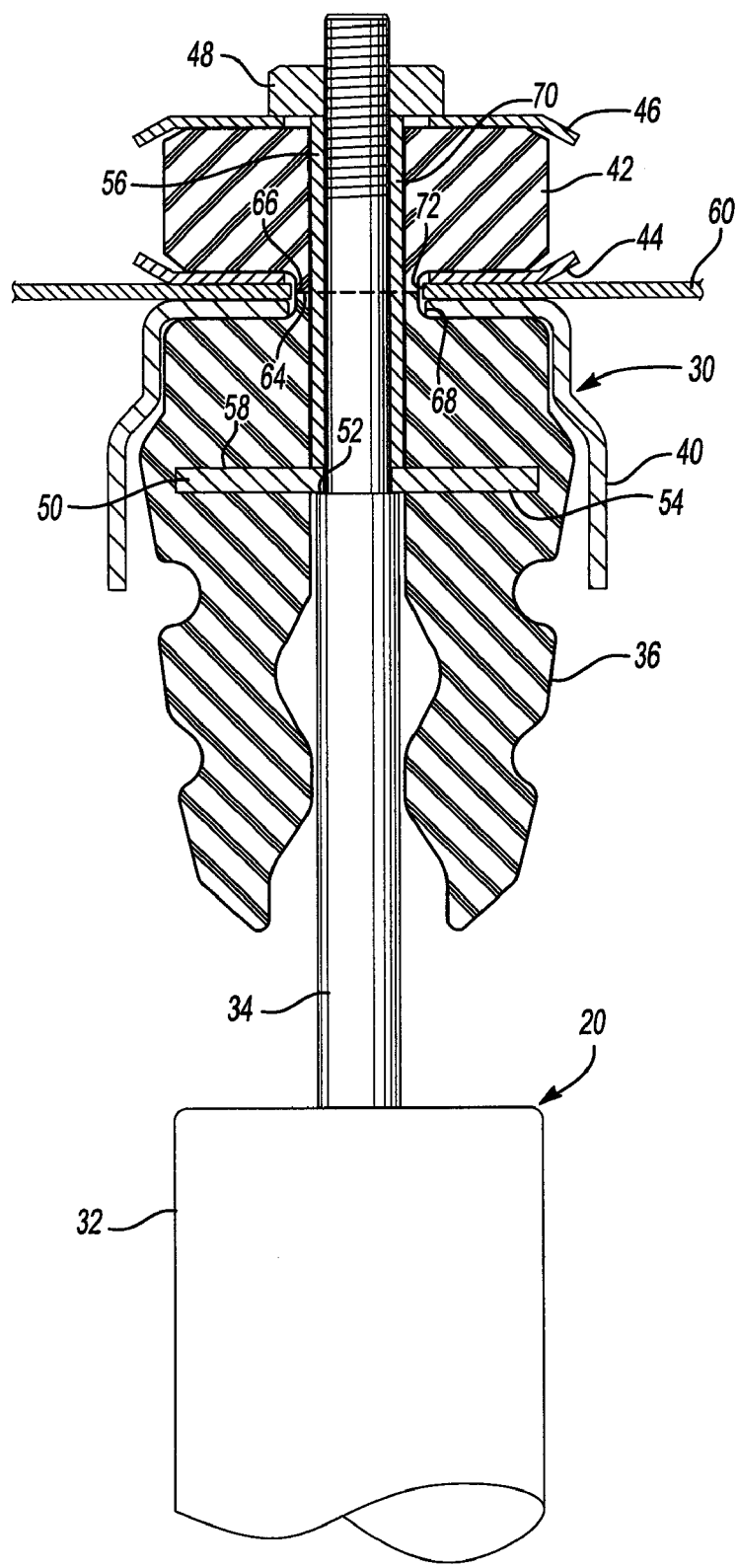
FIG. 4 is a cross sectional view of a integrated shock mount and jounce bumper assembly that is shown with a shock absorber that is not illustrated in cross section.

Referring to FIG. 1, a vehicle 10 is partially shown and includes a frame rail 12 from which a wheel hub 16 is suspended. The wheel hub 16 is connected by a lower suspension arm 18 to the frame 12. A shock absorber generally indicated by reference numeral 20, and a spring 22 are secured between the lower arm 18 and an upper arm 26. A stabilizer bar 28 is also shown and is part of the suspension system. A shock mount and jounce bumper assembly 30 is shown in FIG. 1 and will be explained in greater detail with reference to FIGS. 2 through 5.

Referring to FIG. 2, the shock mount and jounce bumper assembly 30 is shown assembled to the shock absorber 20. The shock absorber 20 includes a shock can 32 and a shock rod 34 to which the assembly 30 is attached. An integrated isolator/jounce bumper 36 forms part of the shock mount and jounce bumper assembly 30. A rate cup 40 is assembled over the integrated isolator/jounce bumper 36. An upper isolator 42 is provided with an upper isolator bottom washer 44 and an upper isolator top washer 46. A shock rod nut 48 is assembled to the distal end of the shock rod 34 to hold the upper isolator 42 on the shock rod 34.

Referring to FIG. 3, a simplified illustration of the integrated isolator/jounce bumper 36 and upper isolator 42 is provided. The upper isolator 42 and integrated isolator/jounce bumper 36 are separated for assembly to the vehicle. Assembly of the shock mount and jounce bumper 30 to the vehicle 10 will be more specifically described with reference to FIGS. 4 and 5 below.

Referring to FIG. 4, the shock absorber 20 is shown assembled to the shock mount and jounce bumper assembly 30. The shock absorber 20 includes the shock can 32 and the shock rod 34. The integrated isolator/jounce bumper 36 is assembled to the shock rod 34 so that an internal washer 50 engages a shoulder 52 formed on the shock rod 34. The internal washer 50 has a first side 54 that engages the shoulder 52. An isolator preload sleeve 56 is assembled over the end of the shock rod 34 and engages a second side 58 of the internal washer 50. The rate cup 40 is assembled over the integrated isolator/jounce bumper 36 prior to assembling the shock absorber 20 and shock mount and jounce bumper assembly 30 to a sheet metal bracket 60 of the vehicle.

Figure 5:
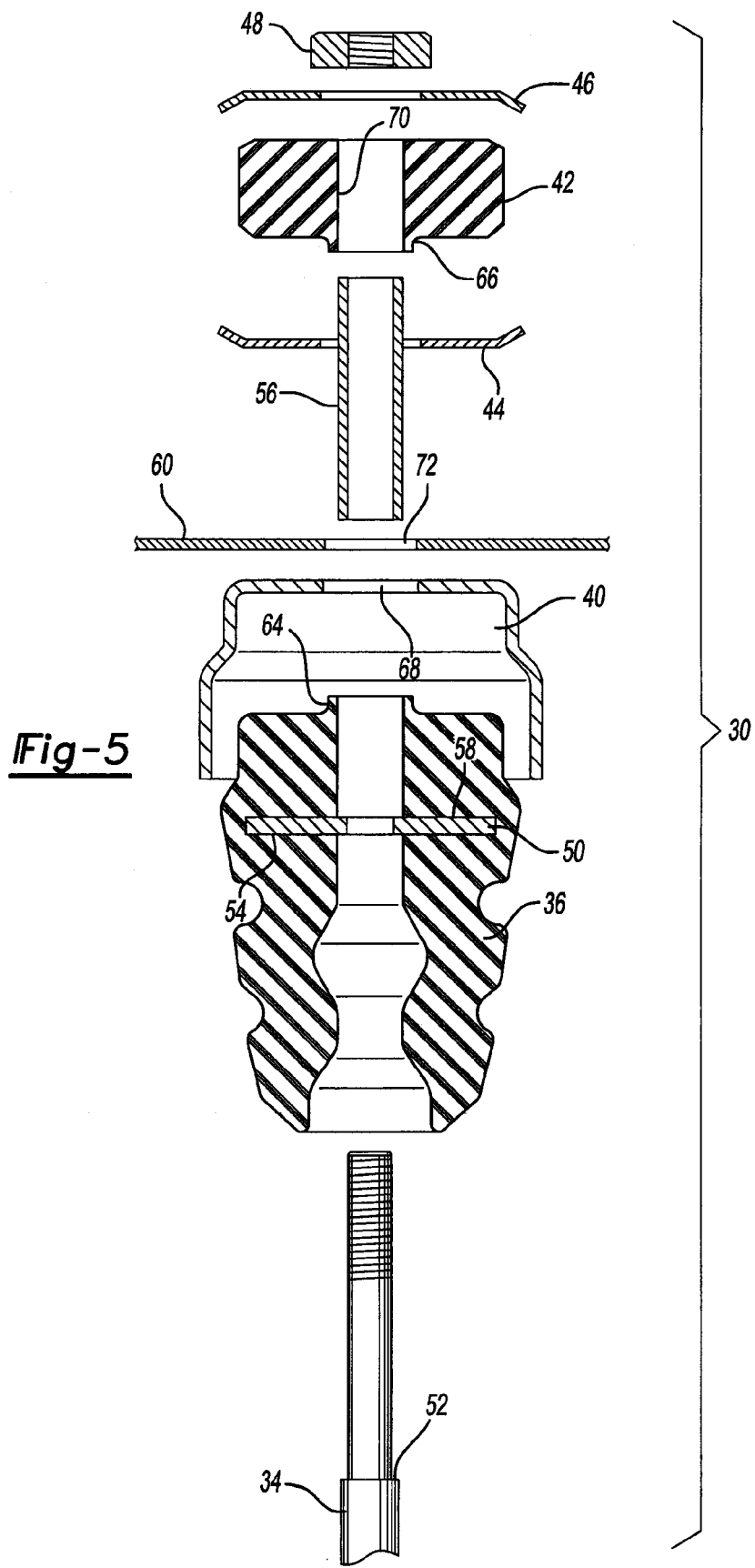
FIG. 5 is an exploded perspective view of a shock mount and jounce bumper assembly.

With reference to FIGS. 3 and 5 in addition to FIG. 4, an upstanding ring 64 is formed on the integrated isolator/jounce bumper 36 and a depending ring 66 is formed on the upper isolator 42. A central hole 68 is provided in the rate cup 40 and an opening is formed in the upper isolator 42 that is also aligned with an opening 72 in the bracket 60. The shock mount and jounce bumper assembly 30 is assembled to the bracket 60 by inserting the shock rod 34 with the rate cup 40 and integrated isolator/jounce bumper 36 assembled to the shock rod 34. The isolator preload sleeve 56 may then be inserted over the end of the shock rod 34 and inside the integrated isolator/jounce bumper 36 until it engages the second side 58 of the internal washer 50. The upstanding ring 64 is inserted into the opening 72 in the bracket 60. The upper isolator 42 may then be assembled with the bottom washer 44 and top washer 46. The upper isolator 42 and washers 44, 46 are assembled over the isolator preload sleeve 56 with the sleeve 56 being received in the opening 70 formed in the upper isolator 42. The shock rod nut 48 is then secured to the shock rod 34 by means of a threaded attachment as is well known in the art.

Referring to FIG. 5, the component parts and method of assembly of the shock mount and jounce bumper assembly 30 will be described in further detail. The integrated isolator/jounce bumper 36 is molded in one piece with the internal washer being insert molded internally in the integrated isolator/jounce bumper 36. The rate cap 40 is assembled over the end of the integrated isolator/jounce bumper 36 with the upstanding ring 64 extending through the rate cup 40. The shock rod 34 is inserted through the bottom of the integrated isolator/jounce bumper 36 until the shoulder 52 engages the first side 54 of the internal washer 50. The shock rod then may be inserted through the opening 72 in the bracket 60 either with or without the isolator preload sleeve 56 being assembled to the shock rod so that the isolator preload sleeve 56 engages the second side 58 of the internal washer 50. The upper isolator 42 including the bottom washer 44 and top washer 46 is assembled over the end of the isolator preload sleeve 56 that extends above the bracket 60. The shock rod nut 48 is then threaded onto the end of the shock rod 34 to complete assembly of the shock mount and jounce bumper assembly 30 to the vehicle.

While the best mode for carrying out the invention has been described in detail, those familiar with the art to which this invention relates will recognize various alternative designs and embodiments for practicing the invention as defined by the following claims.

What is claimed is:

1. An integrated shock mount and jounce bumper assembly, comprising:
   a shock absorber having a shock absorber can and a shock rod, the shock rod having a can end and a distal end that extends from the shock absorber can;
   an integrated isolator and jounce bumper that is formed in one piece and assembled over the shock rod;
   an internal washer retained within the integrated isolator and jounce bumper, and being disposed between integrated isolator and jounce bumper;
   an upper isolator assembly attached to the shock rod and to a vehicle body member by a fastener;
   an isolator preload sleeve assembled over the shock rod and inserted between the isolator assembly and the integrated isolator portion of the integrated isolator and jounce bumper, the preload sleeve engaging one side of the internal washer.

2. The integrated shock mount and jounce bumper assembly of claim 1, further comprising a rate cup assembled to the isolator portion of the integrated isolator and jounce bumper and being disposed between the isolator and the vehicle body member.

3. The integrated shock mount and jounce bumper assembly of claim 1, wherein the upper isolator assembly further comprises a top washer and a bottom washer that are assembled to an isolator body on upper and lower sides of the isolator body.

4. The integrated shock mount and jounce bumper assembly of claim 1, wherein the shock rod has a shoulder, and wherein the internal washer is assembled to the shock rod in engagement with the shoulder and wherein the isolator preload sleeve engages the opposite side of the internal washer than the side that engages the shoulder.

5. The integrated shock mount and jounce bumper assembly of claim 1, wherein the internal washer is disposed between the integrated isolator and the jounce bumper and is insert molded into the integrated shock mount and jounce bumper assembly.

6. The integrated shock mount and jounce bumper assembly of claim 1, wherein the fastener is a nut that is secured to a threaded portion of the shock rod to retain the upper isolator assembly against the vehicle body member.

7. A method of manufacturing an integrated shock mount and jounce bumper assembly, the method comprising:
- molding an integrated isolator and jounce bumper about an internal washer that is disposed between an integrated isolator portion and a jounce bumper portion;
- assembling a rate cup to the isolator portion of the integrated isolator and jounce bumper;
- assembling the integrated isolator and jounce bumper with the rate cup to a shock rod of a shock absorber, the shock rod being inserted into the isolator and jounce bumper and into contact with the internal washer;
- assembling an isolator preload sleeve over a distal end of the shock rod, through the rate cup and inside the isolator portion of the integrated isolator and jounce bumper;
- inserting the shock rod through a bracket that is secured to the vehicle;
- assembling the upper isolator over the distal end of the shock rod on the opposite side from the integrated isolator and jounce bumper; and
- securing the integrated shock mount and jounce bumper assembly to the bracket with a fastener.

8. The method of manufacturing an integrated shock mount and jounce bumper assembly of claim 7 wherein the isolator preload sleeve is inserted inside the isolator portion of the integrated isolator and jounce bumper before the step of inserting the shock rod through the bracket.

9. The method of manufacturing an integrated shock mount and jounce bumper assembly of claim 7 wherein the isolator preload sleeve is inserted inside the isolator portion of the integrated isolator and jounce bumper after the step of inserting the shock rod through the bracket.

10. The method of manufacturing an integrated shock mount and jounce bumper assembly of claim 7 wherein an upstanding ring is formed on the integrated isolator and jounce bumper that is inserted into an opening in the bracket and between the preload sleeve and the bracket.

11. The method of manufacturing an integrated shock mount and jounce bumper assembly of claim 7 wherein a depending ring is formed on the upper isolator that is inserted into an opening in the bracket and between the preload sleeve and the bracket.

12. The method of manufacturing an integrated shock mount and jounce bumper assembly of claim 7 wherein
- the step of molding an integrated isolator and jounce bumper about an internal washer that is disposed between an integrated isolator portion and jounce bumper portion is performed in an injection molding process in which the internal washer is inserted into a mold before the elastomer is injected into the mold to form the isolator portion and the jounce bumper portion.

* * * * *